(12) United States Patent
Edgar

(10) Patent No.: US 8,297,235 B2
(45) Date of Patent: Oct. 30, 2012

(54) SAFETY GATE LADDER FOR SMALL PETS

(76) Inventor: Elizabeth Ann Edgar, Bristow, VA (US)

( * ) Notice: Subject to any disclaimer, the term of this patent is extended or adjusted under 35 U.S.C. 154(b) by 1346 days.

(21) Appl. No.: 11/298,336

(22) Filed: Dec. 9, 2005

(65) Prior Publication Data

US 2007/0131178 A1    Jun. 14, 2007

(51) Int. Cl.
*A01K 29/00* (2006.01)
*B65G 69/30* (2006.01)

(52) U.S. Cl. ........................ 119/847; 119/843

(58) Field of Classification Search ................ 119/847, 119/849, 843, 706; 182/83; 4/496; 114/362
See application file for complete search history.

(56) References Cited

U.S. PATENT DOCUMENTS

| | | | |
|---|---|---|---|
| D222,276 S | 10/1971 | Hughes, Jr. | |
| 3,891,053 A * | 6/1975 | Burton | 182/97 |
| 3,892,290 A * | 7/1975 | Lang | 182/22 |
| 4,527,941 A * | 7/1985 | Archer | 414/537 |
| 4,538,314 A * | 9/1985 | Baranowski | 14/71.1 |
| 4,757,876 A * | 7/1988 | Peacock | 182/95 |
| 5,117,780 A * | 6/1992 | Wooten et al. | 119/162 |
| D375,388 S * | 11/1996 | Tsugita | D30/118 |
| 5,687,813 A * | 11/1997 | Bensch | 182/127 |
| 6,016,629 A | 1/2000 | Sylvester et al. | |
| 6,119,634 A * | 9/2000 | Myrick | 119/847 |
| 6,837,338 B2 * | 1/2005 | Grover | 182/107 |
| 6,941,889 B1 * | 9/2005 | McCrocklin et al. | 114/362 |
| 7,011,036 B1 * | 3/2006 | Hill | 114/362 |

FOREIGN PATENT DOCUMENTS

JP    2003-312366    * 11/2003

OTHER PUBLICATIONS

GSP online catalog, C channel and U channel sizes, <http://gsp.thomasnet.com/viewitems/c-channels/c-channel-standard-sizes?&forward=1> and <http://gsp.thomasnet.com/Asset/c%20dim%20dwg.jpg>, retrieved on Jul. 10, 2009.*
GSP online catalog, C channel and U channel sizes, <http://gsp.thomasnet.com/viewitems/c-channels/c-channel-standard-sizes?&forward=1> and <http://gsp.thomasnet.com/Asset/c%20dim%2020dwg.jpg>, retrieved on Jul. 10, 2009.*
English translation of Japanese patent JP 2003-312366 to Kuroda et al. Nov. 6, 2003.*

* cited by examiner

*Primary Examiner* — David Parsley

(57) ABSTRACT

A ladder placed on the top rail of a gate which has either a ramp or at least one step on one side of the safety gate to aid a small animal to traverse the gate.

20 Claims, 5 Drawing Sheets

SAFETY GATE LADDER FOR SMALL PETS

BACKGROUND OF THE INVENTION

1. Field of the Invention

The present invention relates to a ladder used on a safety gate which allows a small animal to traverse the safety gate.

2. Description of the Related Art

Safety gates are commonly used in homes with small children or animals in order to prevent the child or animal from gaining access to a specific area or room. Safety gates are also used to prevent children from falling down a stairwell. Some safety gates are of a pressure type mounting whereby the gate is adjusted to fit into an opening and then locked into place. Such gates are not recommended to be placed at the top of stairwells since a small child could dislodge the gate from the opening. Other safety gates are of a walk-through design where one side of the gate pivots about a hinge and the other side engages a latch mechanism. The walk-through gates are fixed to the opening by fasteners and are recommended over the pressure type gates for use in stairwells.

Some households in addition to having a small child or large animal, such as a dog, also have a cat or other small animal. Cats, especially indoor cats, generally have a litter box somewhere in the house. Because of the offensive odor of a litter box, the homeowners usually place the litter box in an area of the house less frequently used. A popular choice for a homeowner to keep a litter box is in the basement or lower level of the house. Keeping a litter box in the lower level of the house and using a safety gate at the top of the stairwell however, inevitably traps the cat in the basement until the gate is opened or removed since in most cases a cat will not jump from one side of the gate to the other.

There exists a need for a device to allow a small animal such as a cat to traverse a safety gate in both directions while still preventing a small child or other animal from getting over or through the gate.

SUMMARY OF THE INVENTION

In one embodiment of the invention a ladder used for assisting an animal over a gate comprises a top step and at least one other step, the top step adapted to be placed on a top rail of a gate.

In another embodiment of the invention a ladder comprises a ramp for assisting an animal over a gate, the ramp comprises a landing area having a flat surface, the landing area adapted to be placed on a top rail of a gate, and a sloped surface connected to the landing area.

In yet another embodiment of the invention a ladder used for assisting an animal over a gate comprises a first step component and a second step component each adapted to be placed on a top rail of a gate.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
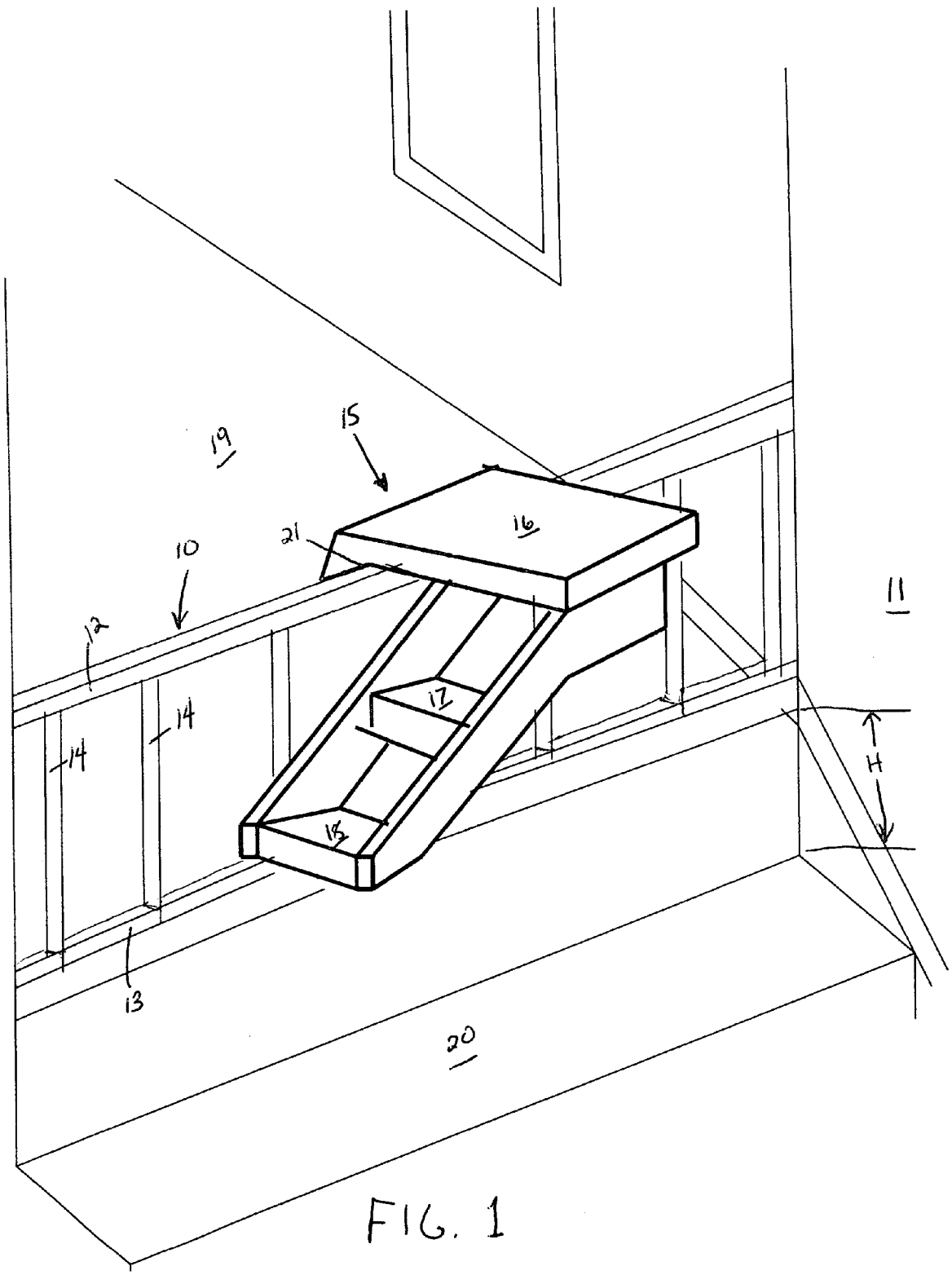
FIG. 1 is a perspective view of a ladder positioned on a gate.

Referring to FIG. 1, a gate 10 is shown which is preferably mounted at the top of a stairwell 11. The gate 10 has a top rail 12 and bottom rail 13. The gate 10 prevents a child or animal from passing through by using a plurality of slats 14. Other means besides slats are commonly used to form the gate such as rigid plastic and mesh. A ladder 15 fits over the top rail 12 and has a plurality of steps 16-18 on one side of the gate 10. The steps 16-18 comprise a first step 16 which acts as a landing area for an animal when jumping from the floor to the ladder, a middle step 17 and a bottom step 18. To traverse the gate in a first direction, an animal first jumps from the floor 19 to the landing area or first step 16 and then walks down each step 17, 18 to the floor or stairwell step 20 on the other side of the gate. To cross back over to the first side, the animal simply walks up each step 18, 17, 16 and then jumps from the top step 16 to the floor 19 on the first side. When used at the top of a stairwell 11, the ladder is best placed so that the stairs 16, 17, 18 of the ladder 15 are on the side of the gate 10 with the stairwell stairs 20 since firstly, the stairwell step 20 disadvantageously creates an extra height (H) the animal would need to jump to reach the landing area 16 if the steps 17, 18 were on the other side of the gate; and secondly the child or animal on the floor 19 without the steps 17, 18 cannot use the steps 17, 18 for pulling themselves up over the gate 10.

The landing area or first step 16 is preferably larger in area than the steps 17, 18 so that the landing area or first step 16 may be extended over the top rail 12 and have provided thereon top rail engaging means 21. Top rail engaging means 21 may comprise a channel formed in the landing area or first step 16, wherein the top rail 12 engages the channel 21. The channel 21 may be tapered to accommodate various sized top rails 12. Alternatively, the landing area or step 16 may be fastened to the top rail with screws, clamps, bolts and nuts, or other suitable fasteners known in the art.

Figure 2:
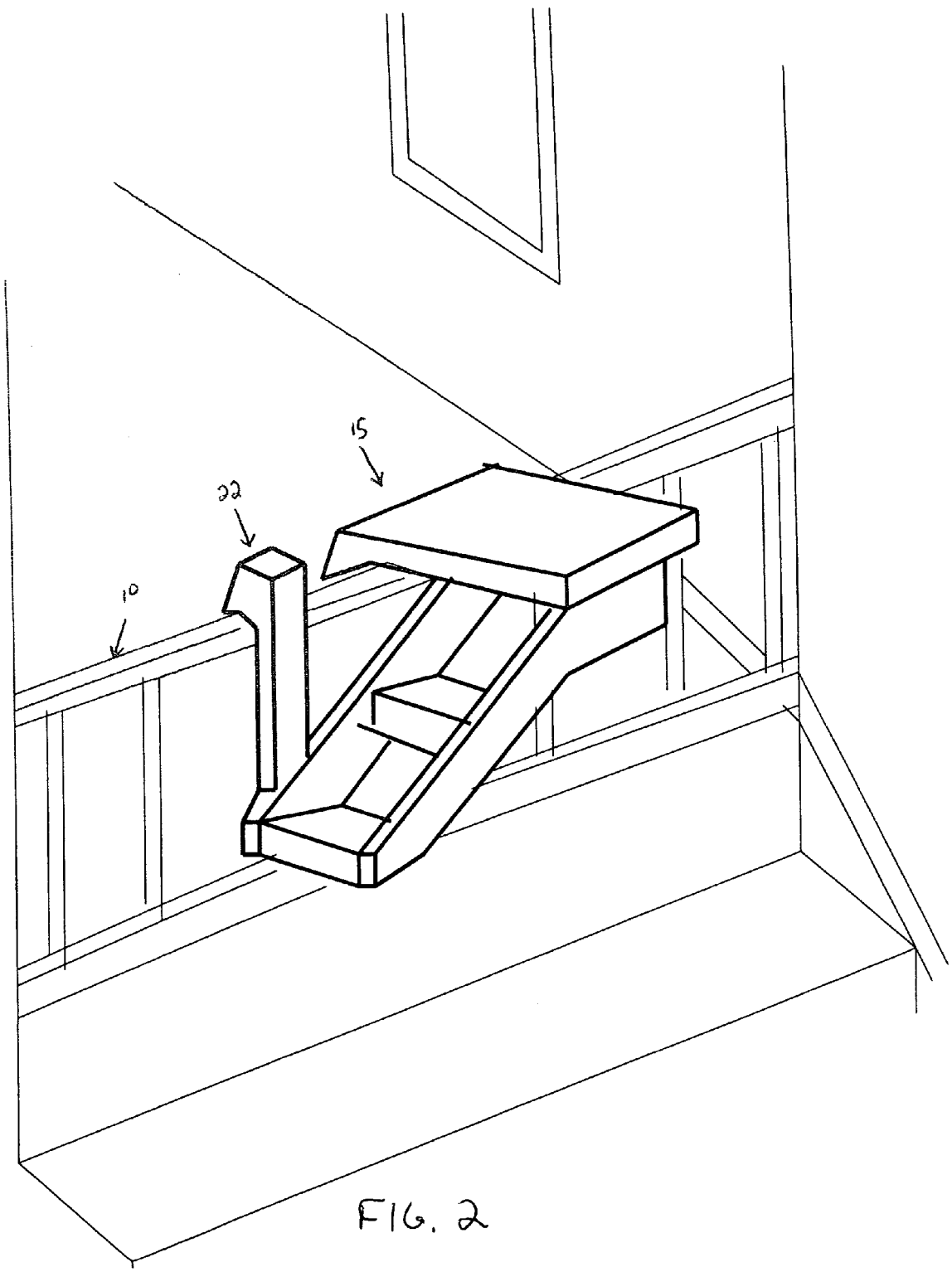
FIG. 2 is a perspective view of a ladder similar to FIG. 1, but with the addition of a hook attached to the ladder.

FIG. 2 shows the ladder 15 of FIG. 1, but with a hook 22 attached to a portion of the ladder. The hook 22 helps stabilize the ladder 15 when hanging on the gate 10.

Figure 3:
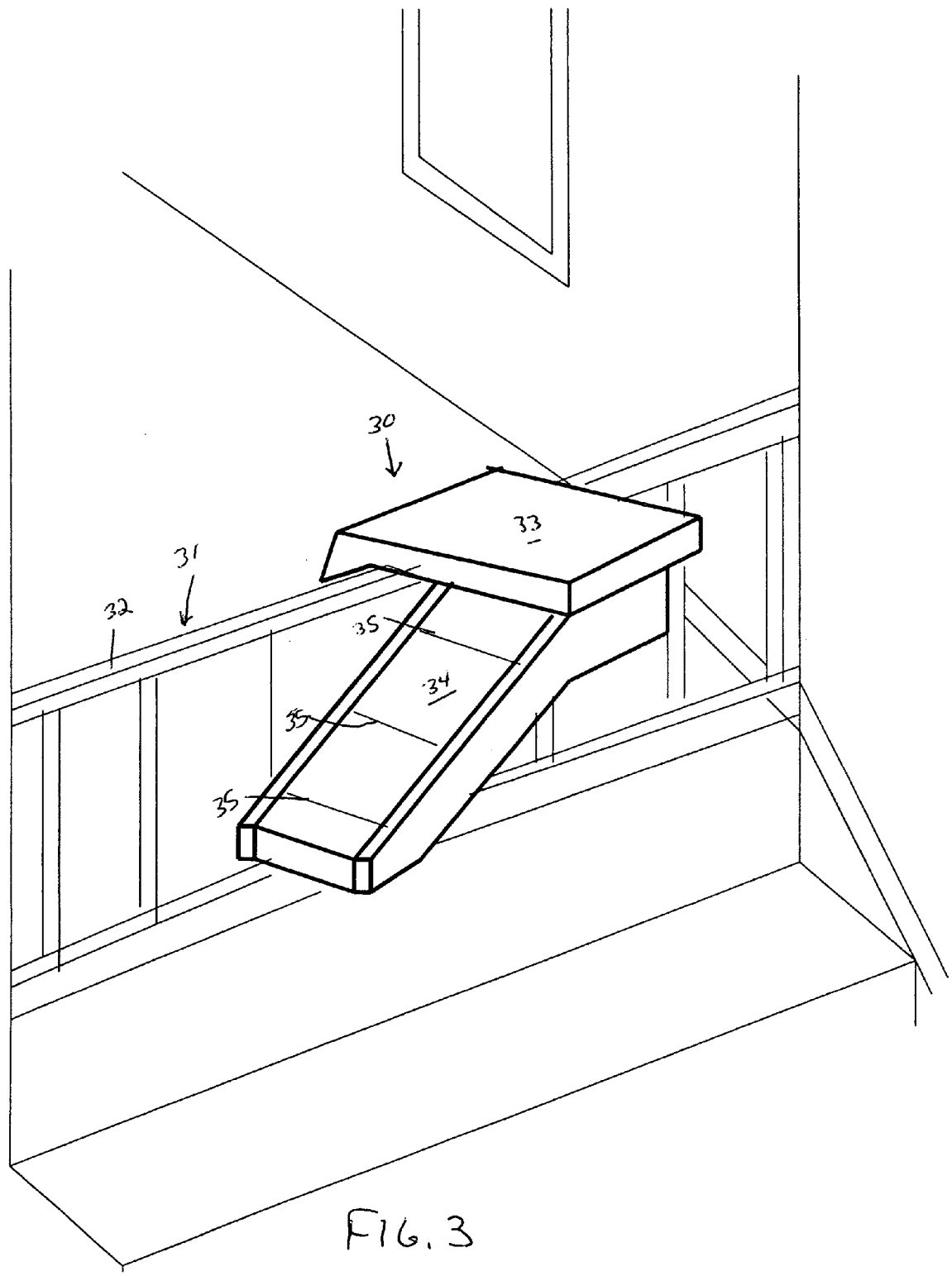
FIG. 3 is a perspective view of another embodiment of the invention showing a ladder having a ramp and a landing area.

FIG. 3 shows another embodiment of the invention wherein a ladder 30 is positioned on a gate 31 top rail 32, and comprises a landing area or step 33 and a sloped surface or ramp 34 connected thereto. The ramp 34 may have a plurality of projections 35 thereon for aiding the animal to climb or descend the sloped surface or ramp 34.

Figure 4:
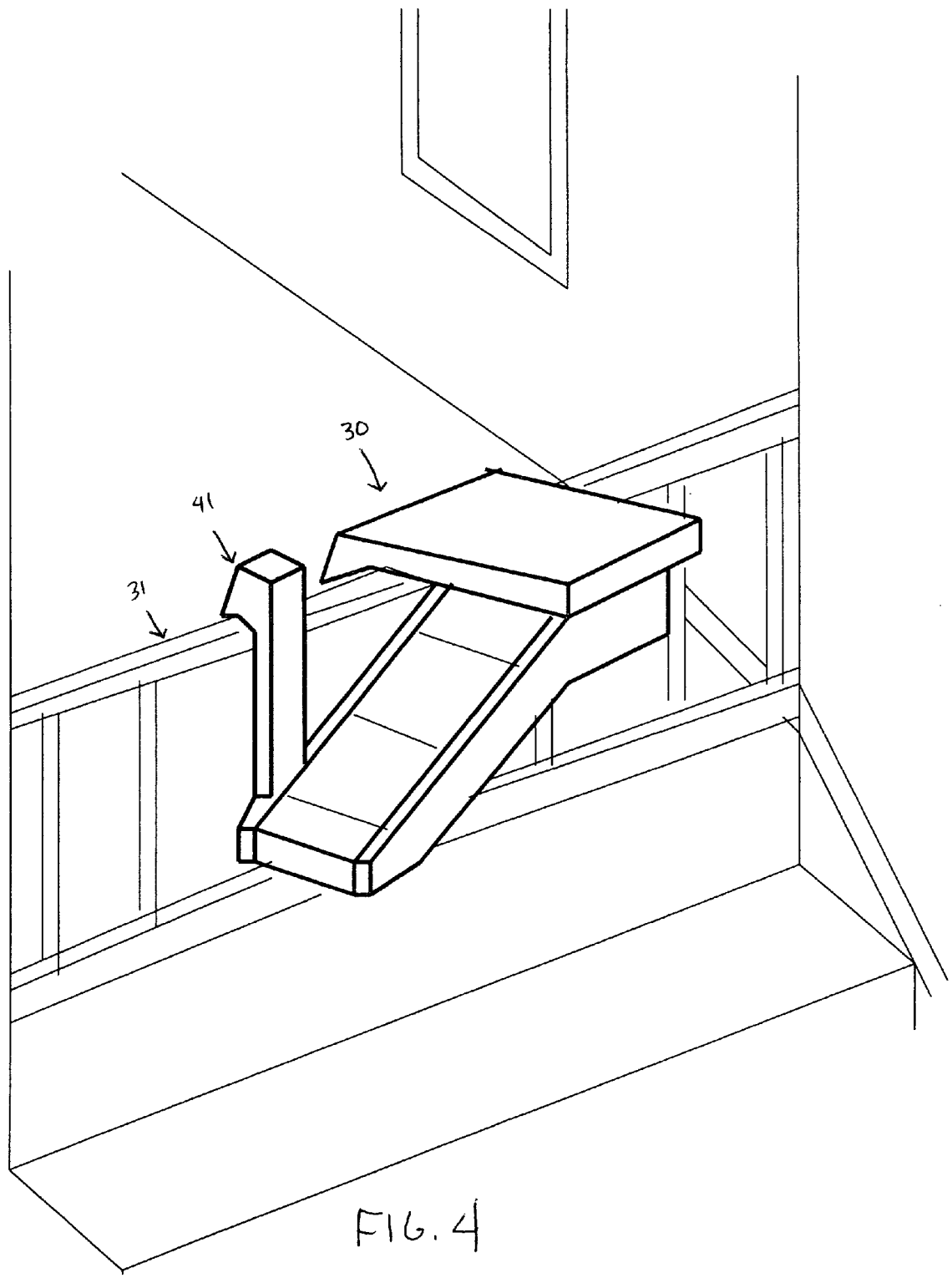
FIG. 4 is a perspective view of a ladder similar to FIG. 3, but with the addition of a hook attached to the ladder.

FIG. 4 shows the ladder 30 of FIG. 3, but with a hook 41 attached to a portion of the ladder 30. The hook 41 helps stabilize the ladder 30 when hanging on the gate 31.

Figure 5:
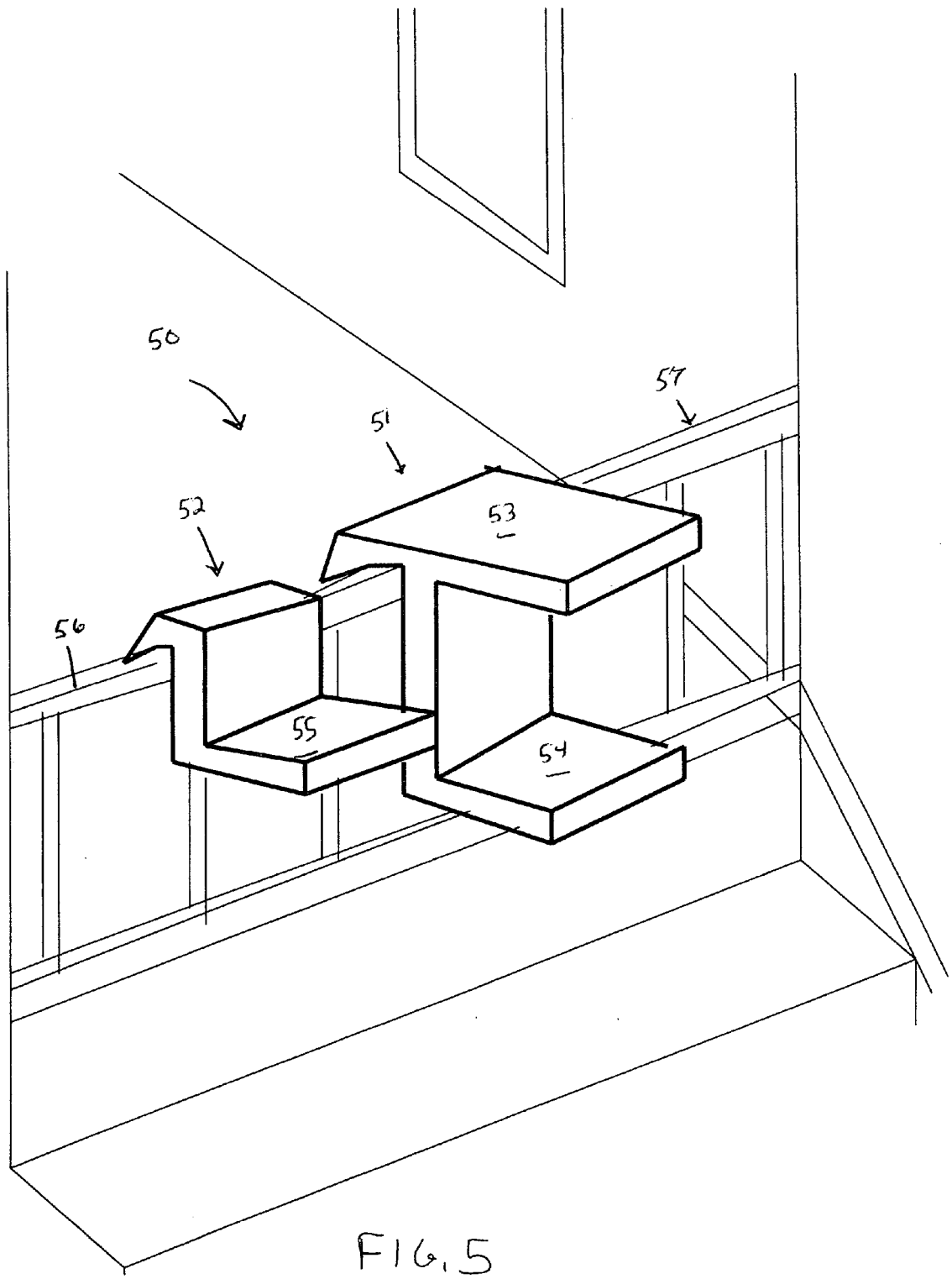
FIG. 5 is a perspective view of yet another embodiment of the invention showing a combination of step components used together to form a ladder.

FIG. 5 shows yet another embodiment of the invention wherein a first ladder component 51 and a second ladder component 52 are used to form a ladder 50. The first ladder component 51 comprises a first step or landing area 53 and a second step 54 underneath the first step 53, and the second ladder component 52 comprises a first step 55. Each ladder component 51,52 is placed on the top rail 56 of a gate 57 allowing the animal to walk from the first step 53 of the first ladder component 51 to the first step 55 of the second ladder component 52, to the second step 54 of the first ladder component 51.

The ladder may be formed of any suitable material or combinations of material, including plastics, metals, and wood. Furthermore, the steps of the ladder, including the ramp and projections, may be covered with a material such as carpet.

Furthermore, since the gate is preferably used at the top of a staircase, where the use of a walk-through gate is recommended, the ladder is sized so that it does not interfere with the operation of the gate. Therefore, someone wishing to ascend or descend the stairwell stairs need not detach the ladder from the gate every time the gate is swung open.

The foregoing description is considered as illustrative only of the principles of the invention. Furthermore, since numerous modifications and changes will readily occur to those skilled in the art, it is not desired to limit the invention to the exact construction and process as described above.

What is claimed is:

1. In combination, a ladder comprising:
   a top step;
   at least one other step; and
   a gate configured to be used at the top of a stairwell, the gate comprising a top rail; wherein
   said top step is adapted to be placed on said top rail of said gate so that said at least one other step is positioned below said top step and alongside said gate.

2. A ladder as claimed in claim 1 wherein said top step comprises a channel.

3. A ladder as claimed in claim 1 further comprising a hook.

4. A ladder as claimed in claim 1 wherein said ladder is covered with carpet.

5. A ladder as claimed in claim 2 wherein said channel is tapered to allow the ladder to be placed on different sized top rails.

6. A ladder as claimed in claim 1 wherein the ladder is fixed to said top rail by any one of screws, clamps, and bolts and nuts.

7. In combination, a ladder comprising:
   a gate configured to be used at the top of a stairwell, the gate comprising a top rail;
   a landing pad having a flat surface, said landing pad adapted to be placed on said top rail of said gate; and
   a sloped surface connected to said landing pad; wherein
   said sloped surface is positioned below said landing pad and extends alongside said gate.

8. A ladder as claimed in claim 7 wherein said ladder is covered with carpet.

9. A ladder as claimed in claim 7 wherein said landing pad comprises a channel.

10. A ladder as claimed in claim 7 wherein said sloped surface comprises at least one projection thereon.

11. A ladder as claimed in claim 7 further comprising a hook.

12. A ladder as claimed in claim 9 wherein said channel is tapered to allow said ladder to be placed on different sized top rails.

13. A ladder as claimed in claim 7 wherein said ladder is fixed to said top rail by any one of screws, clamps, and bolts and nuts.

14. In combination, a ladder comprising:
   a gate configured to be used at the top of a stairwell, the gate comprising a top rail;
   a first ladder component adapted to be placed on said top rail of said gate and;
   a second ladder component adapted to be placed on said top rail of said gate; wherein,
   said first ladder component comprises a first step;
   said second ladder component comprises a first step;
   wherein said first step of said first ladder component is positioned alongside said gate;
   wherein said first step of said second ladder component is positioned alongside said gate; and
   wherein said first ladder component and said second ladder component are separate components which are each placed on said top rail of said gate.

15. The combination of claim 14 wherein said first ladder component further comprises a second step.

16. The combination of claim 15 wherein said first ladder component second step is underneath said first ladder component first step.

17. The combination of claim 14 wherein said first ladder component and said second ladder component each comprise a channel.

18. The combination of claim 17 wherein each said channel is tapered to allow said ladder to be placed on different sized top rails.

19. The combination of claim 14 wherein said first ladder component and said second ladder component are covered with carpet.

20. The combination of claim 14 wherein said first ladder component and said second ladder component are fixed to said top rail by any one of screws, clamps, and bolts and nuts.

* * * * *